(12) United States Patent
Dooley et al.

(10) Patent No.: US 7,802,757 B2
(45) Date of Patent: Sep. 28, 2010

(54) METHOD AND SYSTEM FOR TAXIING AN AIRCRAFT

(75) Inventors: Kevin Allan Dooley, Mississauga (CA); Nashed Youssef, Mississauga (CA)

(73) Assignee: Pratt & Whitney Canada Corp., Longueuil (CA)

( * ) Notice: Subject to any disclaimer, the term of this patent is extended or adjusted under 35 U.S.C. 154(b) by 1030 days.

(21) Appl. No.: 11/269,700

(22) Filed: Nov. 9, 2005

(65) Prior Publication Data

US 2007/0101721 A1 May 10, 2007

(51) Int. Cl.
*B64D 35/00* (2006.01)
*F02C 7/275* (2006.01)

(52) U.S. Cl. .......................... 244/60; 60/788
(58) Field of Classification Search ................... 60/802; 244/60, 55, 50, 51, 62
See application file for complete search history.

(56) References Cited

U.S. PATENT DOCUMENTS

| | | | | |
|---|---|---|---|---|
| 3,397,854 A | * | 8/1968 | Reyle | ........................... 244/55 |
| 4,900,231 A | | 2/1990 | Kennedy | |
| 4,927,329 A | | 5/1990 | Kliman et al. | |
| 5,184,458 A | | 2/1993 | Lampe et al. | |
| 5,309,029 A | | 5/1994 | Gregory et al. | |
| 5,485,717 A | * | 1/1996 | Williams | ..................... 60/773 |
| 5,555,722 A | * | 9/1996 | Mehr-Ayin et al. | ............ 60/788 |
| 5,581,168 A | * | 12/1996 | Rozman et al. | ............. 318/723 |
| 5,694,765 A | | 12/1997 | Hield et al. | |
| 5,813,630 A | | 9/1998 | Williams | |
| 5,867,979 A | | 2/1999 | Newton et al. | |
| 6,353,790 B1 | * | 3/2002 | Tsuzuki | ...................... 701/100 |
| 6,729,140 B2 | * | 5/2004 | Care et al. | .................... 60/802 |
| 6,729,575 B2 | | 5/2004 | Bevilaqua | |
| 2004/0118128 A1 | * | 6/2004 | Bruno et al. | .................. 60/801 |
| 2004/0129835 A1 | | 7/2004 | Atkey et al. | |
| 2005/0199766 A1 | * | 9/2005 | Knott et al. | .................... 244/55 |
| 2006/0042252 A1 | * | 3/2006 | Derouineau | .................. 60/703 |
| 2006/0168968 A1 | * | 8/2006 | Zielinski et al. | ............... 60/778 |
| 2007/0022735 A1 | * | 2/2007 | Henry et al. | ............. 60/39.162 |

OTHER PUBLICATIONS

International Search Report PCT/CA2006/001274, Nov. 23, 2006.

* cited by examiner

*Primary Examiner*—Michael Cuff
*Assistant Examiner*—Gerald L Sung
(74) *Attorney, Agent, or Firm*—Ogilvy Renault LLP

(57) ABSTRACT

The system is used for taxiing an aircraft and comprises at least one multi-spool gas turbine engine, the engine having an electrical motor in a torque-driving engagement with a low pressure spool of the engine. The low pressure spool has a propulsor connected thereon to generate thrust when rotated. A controller is connected to the electrical motor and an electrical power source to control an amount of electrical power provided from the power source to the electrical motor so as to drive the propulsor and cause at least a major portion of the thrust to be generated by the propulsor for moving the aircraft during taxiing.

7 Claims, 2 Drawing Sheets

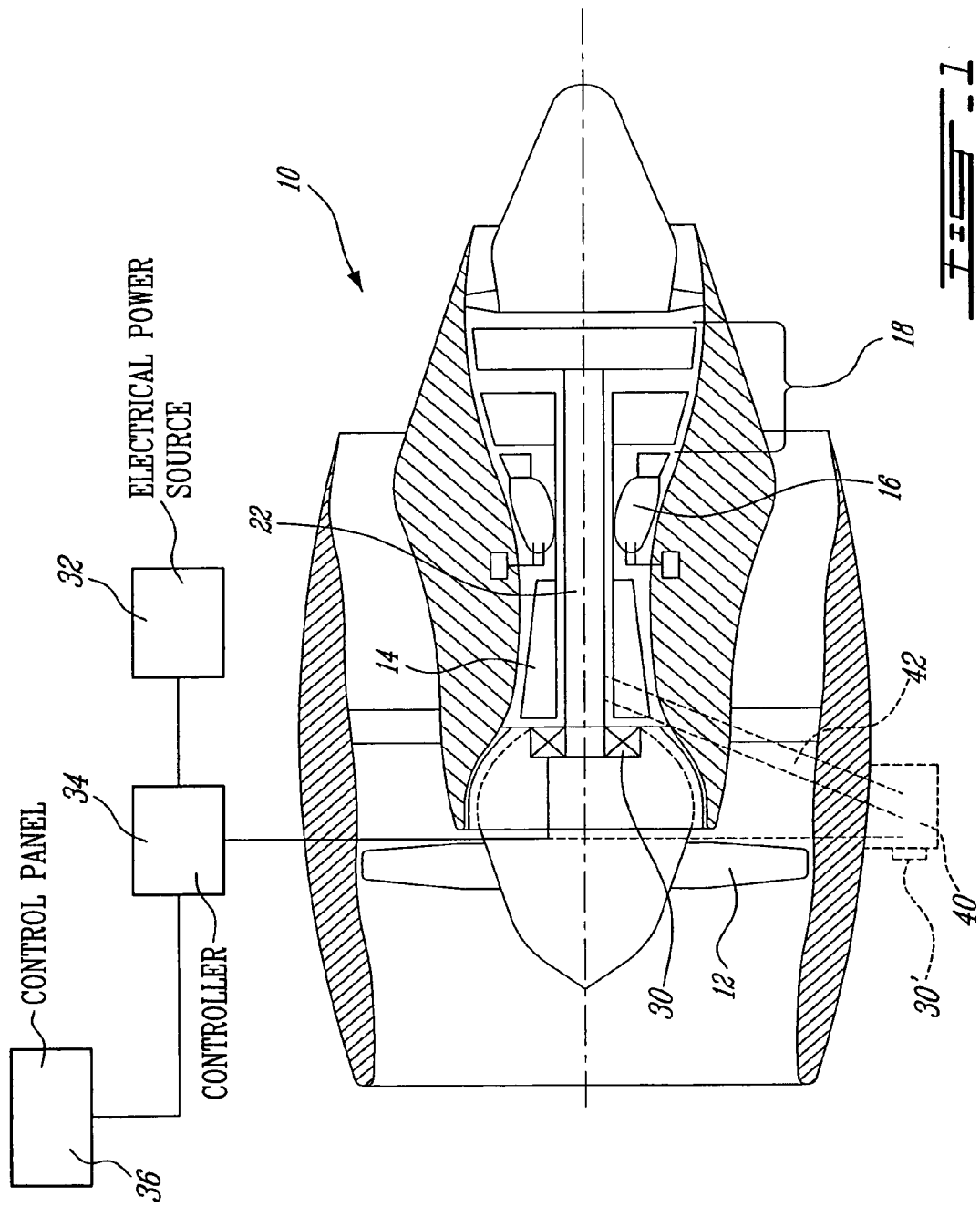

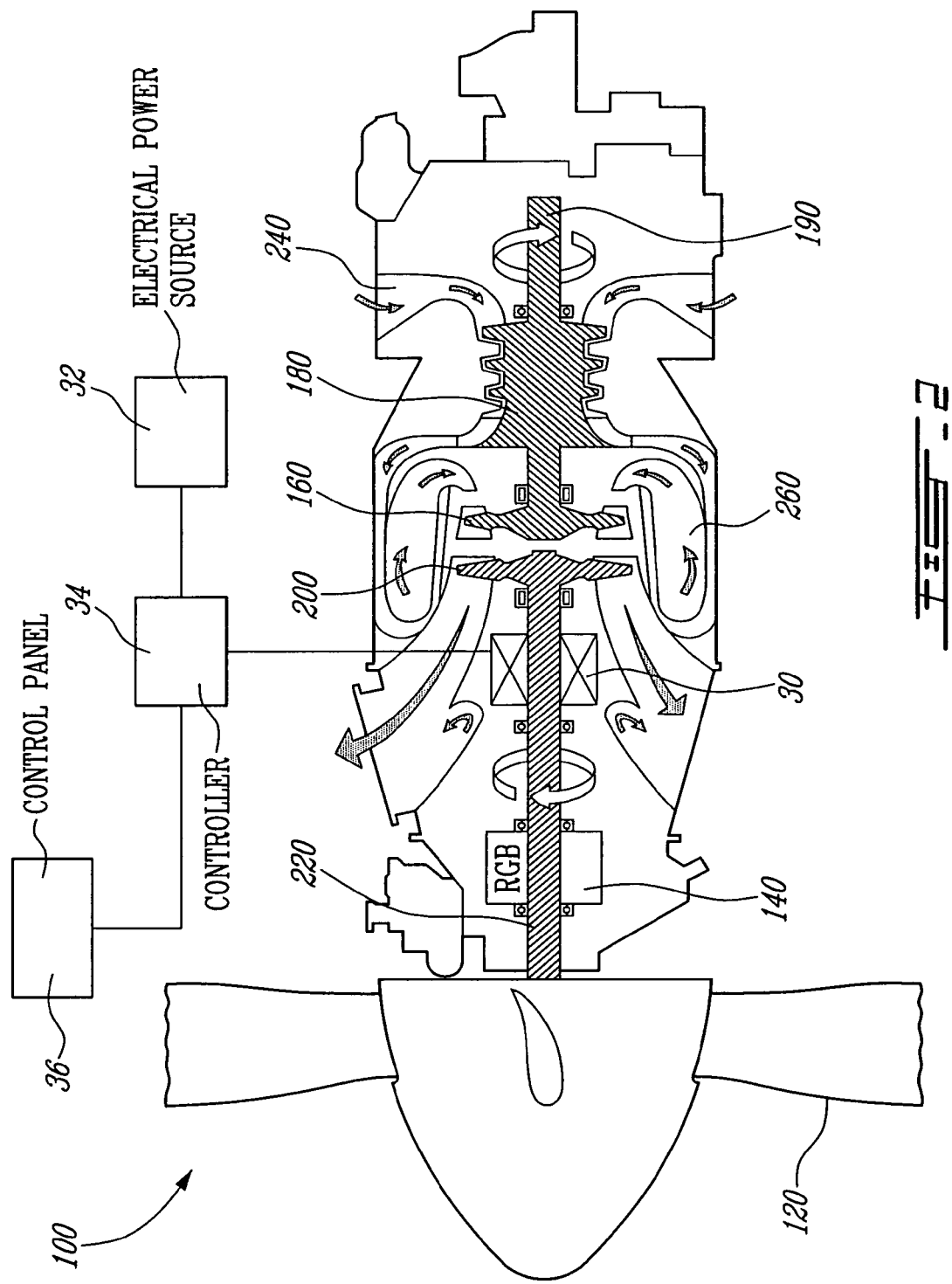

METHOD AND SYSTEM FOR TAXIING AN AIRCRAFT

TECHNICAL FIELD

The invention relates generally to a method and a system for taxiing an aircraft having at least one gas turbine engine.

BACKGROUND OF THE ART

In many airports, especially small airports, some passengers are required to walk outside between a terminal gate and an aircraft. Passengers and airport personnel must be kept at a sufficient distance from any aircraft having a gas turbine engine in operation. Even if they are not in the immediate vicinity of aircrafts, passengers and airport personnel must keep away from them due to the noise and the wake created by an operating engine. This may increase the interval between an arrival and a departure, which can be a significant drawback, especially in the case of aircrafts whose operations involve numerous short stops. Also, crowed airports may require aircrafts to run engines at idle or at low speeds for a long time between a terminal gate and the runway, or vice-versa. Running at least one engine is required to taxi the aircraft and it must be maintained in operation until the aircraft reaches the runway or its gate at the service area, depending on the case. Since fuel is burned during the operation of the engine, any delay while taxiing an aircraft increases its operating costs.

SUMMARY OF THE INVENTION

In order to mitigate at least some of the above-mentioned problems, it is an object of the present invention to provide an improved method and system allowing an aircraft to taxi under its own power using one or more engines where thrust is generated during taxiing using a propulsor receiving at least a major portion of its power from an electrical motor provided in the corresponding engine.

In one aspect, the present invention provides a system for taxiing an aircraft, the system comprising: at least one multi-spool gas turbine engine, the engine having an electrical motor in a torque-driving engagement with a low pressure spool of the engine, the low pressure spool having a propulsor connected thereon to generate thrust when rotated; and a controller connected to the electrical motor and an electrical power source to control an amount of electrical power provided from the power source to the electrical motor so as to drive the propulsor and cause at least a major portion of the thrust to be generated by the propulsor for moving the aircraft during taxiing.

In another aspect, the present invention provides a system to be used on an aircraft during taxiing for generating thrust in a gas turbine engine, the engine having a propulsor mechanically connected to at least one turbine, the propulsor being configured and disposed to receive power from the turbine at least during take-off and in flight, the system comprising: an electrical motor mechanically connected to the propulsor of the engine; and means for supplying sufficient electrical power to the electrical motor so as to rotate the propulsor and move the aircraft during taxiing in replacement of at least a major portion of the power from the turbine of the engine.

In another aspect, the present invention provides a method of moving an aircraft during taxiing using thrust generated by a propulsor of a gas turbine engine mounted on the aircraft, the engine comprising an electrical motor in a torque-driving engagement with the propulsor, the method comprising: conducting electrical power to the electrical motor for rotating the propulsor; and generating sufficient thrust by the propulsor using the electrical motor for moving the aircraft.

In another aspect, the present invention provides a method of generating electrical power from a shutdown gas turbine engine having a propulsor and being mounted on a flying aircraft, the method comprising: rotating the propulsor using a windmill effect caused by movement of the flying aircraft through air; and generating electrical power using torque produced by the windmill effect on of the propulsor of the gas turbine engine.

Further details of these and other aspects of the present invention will be apparent from the detailed description and figures included below.

DESCRIPTION OF THE DRAWINGS

Reference is now made to the accompanying figures depicting aspects of the present invention, in which:

FIG. 1 is a schematic view of a multi-spool gas turbine engine showing an example of a possible environment in which the system and method can be used; and FIG. 2 is a schematic view of a multi-spool gas turbine engine showing another example of a possible environment in which the system and method can be used.

DETAILED DESCRIPTION OF THE PREFERRED EMBODIMENTS

FIG. 1 illustrates an example of a turbofan 10. This engine 10 comprises in serial flow communication a propulsor, in this case a fan 12, through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases. The fan 12, when rotated, generates thrust using the power received through at least one turbine of the turbine section 18.

FIG. 1 also shows that the engine 10 is provided with an electrical motor 30 coaxially mounted and in a torque-driving engagement on the shaft 22 of the low pressure spool to which the fan 12 is connected. The electrical motor 30 is designed to be sufficiently powerful to drive the fan 12 in order to taxi the aircraft without using fuel in the engine 10 or using a significantly reduced amount of fuel. Electricity is sent from the electrical power source 32 to the electrical motor 30 via a controller 34 which is connected between them. The electrical power source 32 may include one or more electrical batteries, an auxiliary power unit (APU), a generator from another engine on the aircraft, etc.

It is possible, if required, to provide an electrical motor 30' in an auxiliary gearbox (AGB) 40 that is in a torque-driving engagement with the low pressure spool through a tower shaft 42, as shown in the dotted lines in FIG. 1, so as to replace the coaxially-mounted electrical motor 30. Sets of gears (not shown) would also be provided in this mechanical connection.

For compactness, the electrical motor 30 (or even 30') can be designed to serve as a generator to generate electricity during normal operation of the engine 10, such as during take-off and in flight.

In use, the controller 34 actuates the amount of electrical power supplied to the electrical motor 30 in response to control signals it receives, for instance commands from the pilots of the aircraft sent using a control panel 36. The controller 34 and the electrical power source 32 are configured to supply enough electrical power to the electrical motor 30 for providing a major portion, if not all of the torque required to rotate the fan 12 and move the aircraft during taxiing. This, in practice, requires these parts to withstand high voltages and electrical currents since the electrical power required to move a loaded aircraft may be relatively high. However, because the electrical motor 30 drives only the low pressure spool and is not driving directly the high pressure spool, the electrical power required to generate the thrust at the fan 12 is lower than the power to be generated internally by an engine running only on fuel while taxiing.

Although the system could be designed to provide all the power required to rotate the fan 12 during taxiing using the electrical motor 30 only, the engine 10 can still partially run on fuel during that segment and a fraction of the power provided to the fan 12 could still be generated by energy received from the combustor 16.

Overall, since the aircraft is allowed to taxi without fuel or using a much smaller amount of fuel, and because air comes out of the engine at a lower speed and at a temperature closer to than ambient temperature, less noise is generated by the engine and the wake turbulence behind the engine is smaller. Also, the rotation of the propulsor, such as the fan 12, can be easily stopped or slowed down significantly in order to save energy in the event of a long waiting time while the aircraft is on a taxiway. The fan 12 is otherwise designed to receive power from a turbine during other parts of the cycle, such as take-off and during the flight.

It should be noted that one can choose not to provide or operate all engines with the above-mentioned system, and keep one or more of the engines running only on fuel during taxiing. Electrical power from this or these engines can be used at the electrical motor 30 of the other engines.

It should be noted that the controller 34 may be connected to an electronic engine control (EEC) (not shown) for a closed-loop feedback. The control panel 36 may also be connected to the EEC and the control signals may be sent to the controller 34 via the EEC.

The electrical motor 30 may also function as an emergency power supply generator in the event that the engine 10 is shut down during flight of the aircraft, since the windmill effect can be used to rotate the fan 12, which then rotates the low pressure spool as a result of forward flight similar in function to a Ram Air Turbine (RAT). Torque from the fan 12 is then transferred to the generator where it is transformed into electrical power to be used wherever required.

FIG. 2 illustrates a turboprop engine 100 of a type preferably provided for use in subsonic flight to drive a propulsor, namely a propeller 120 via a reduction gear box (RGB) 140. The RGB 140 reduces the speed of a power turbine 200 to one suitable for the propeller 120. The power turbine 200 provides rotational energy to drive the propeller 120. The engine 100 comprises a first spool consisting of a high pressure turbine 160, a high pressure compressor 180 and a shaft 190, and a second spool consisting of a low pressure power turbine 200 mounted on a power turbine shaft 220, itself driving the propeller 120 through the RGB 140. The compressor 180 draws air into the engine 100 via an annular plenum chamber 240, increases its pressure and delivers it to a combustor 260 where the compressed air is mixed with fuel and ignited for generating a stream of hot combustion gases. The high pressure turbine 160 extracts energy from the hot expanding gases for driving the compressor 180. The hot gases leaving the high pressure turbine 160 are accelerated again as they expand through the power turbine 200. The first and second spools of the engine 100 are not connected together. They rotate at different speeds and in opposite directions. This design is referred to as a "Free Turbine Engine". It must be understood that the present invention could also be applied to other designs of propeller engines as well. In the embodiment illustrated in FIG. 2, an electrical motor 30 is coaxially mounted around the power turbine shaft 220. It would have also been possible to provide it in an auxiliary gearbox (not shown) located at the bottom of the engine 100. Operation of the electrical motor 30 and the other components of the engine 100 are similar to those described in FIG. 1, including the possible use of the electrical motor 30 as a generator for emergency situations.

The above description is meant to be exemplary only, and one skilled in the art will recognize that changes may be made to the embodiments described without departing from the scope of the invention disclosed. For example, the invention can be used with other models of gas turbine engines than those shown in the figures and described herein. The electrical motor 30 can be used to keep the engine running at idle speed without or with a reduced amount of fuel in case of a long waiting time while an aircraft taxies. The turbofan 10 can have one or more additional compression stages mounted on the low pressure spool. Still other modifications which fall within the scope of the present invention will be apparent to those skilled in the art, in light of a review of this disclosure, and such modifications are intended to fall within the appended claims.

What is claimed is:

1. An apparatus for propelling an aircraft during taxiing on a ground surface by generating thrust using a gas turbine engine without burning fuel in the engine, the engine having an engine core defined radially inward of a gas path, having an axis of rotation and having a propulsor mechanically connected to at least one low pressure turbine rotating on a low pressure turbine shaft about the axis, the propulsor being configured and disposed to receive power from the turbine during take-off and in flight, the apparatus comprising:

an electrical motor sufficiently powerful to taxi the aircraft on the low pressure turbine shaft, the low pressure turbine shaft having the propulsor of the engine mounted thereto, the electrical motor and low pressure turbine shaft being disposed in the engine core, the electrical motor having a rotor mounted on the low pressure turbine shaft and rotating co-axially about the axis of rotation of the engine; and an electrical power source in communication with the electrical motor to supply sufficient electric power to the electrical motor so as to rotate the propulsor and move the aircraft during taxiing on the ground surface using thrust generated by the electric power driving the electric motor without burning fuel in the engine.

2. The apparatus as defined in claim 1, wherein the gas turbine engine is a turbofan and the propulsor includes a fan.

3. The apparatus as defined in claim 1, wherein the gas turbine engine is a turboprop and the propulsor includes a propeller.

4. The apparatus as defined in claim 1, wherein the electrical motor is operable as a generator during take-off and while the aircraft is in flight.

5. The apparatus as defined in claim 1, wherein the electrical power source is an electrical battery.

6. The apparatus as defined in claim 1, wherein the electrical power source is an auxiliary power unit (APU).

7. The apparatus as defined in claim 1, wherein the electrical power source is a generator driven by a fuel burning engine on the aircraft.

* * * * *